United States Patent [19]
Chabre

[11] 3,844,174
[45] Oct. 29, 1974

[54] METHOD AND DEVICE FOR THE RAPID MEASUREMENT OF THE MASS AND CONCENTRATION OF PARTICLES

[75] Inventor: Andre Paul Chabre, Zup, France

[73] Assignee: Commissariat A L'Energie Atomique, Paris, France

[22] Filed: Oct. 12, 1972

[21] Appl. No.: 296,944

[30] Foreign Application Priority Data
Oct. 18, 1971   France .............................. 71.37298

[52] U.S. Cl. ............. 73/432 PS, 73/28, 73/DIG. 4, 310/8.7
[51] Int. Cl. .................................... G01n 15/00
[58] Field of Search .......... 73/432 PS, 61 R, 28, 23, 73/194 B, 11, 12, DIG. 4, 170 R, 432 R; 324/71 CP; 310/8.7; 340/191, 236

[56] References Cited
UNITED STATES PATENTS

| | | | |
|---|---|---|---|
| 2,691,159 | 10/1954 | Heibel | 73/11 X |
| 3,024,641 | 3/1962 | Fix | 73/DIG. 4 |
| 3,159,029 | 12/1964 | Ruderman | 73/170 R |
| 3,260,104 | 7/1966 | King, Jr. | 73/23 |
| 3,307,052 | 2/1967 | Neilson et al. | 310/8.5 X |
| 3,307,407 | 3/1967 | Berg et al. | 73/432 R |
| 3,561,253 | 2/1971 | Dorman | 73/28 |
| 3,561,831 | 2/1971 | Alibert et al. | 310/8.7 |
| 3,587,291 | 6/1971 | Escallier et al. | 73/12 |
| 3,653,253 | 4/1972 | Olin | 73/28 |
| 3,715,911 | 2/1973 | Chuan | 73/28 |

FOREIGN PATENTS OR APPLICATIONS
1,810,519   11/1968   Germany .......................... 73/194 B

*Primary Examiner*—Richard C. Queisser
*Assistant Examiner*—Joseph W. Roskos
*Attorney, Agent, or Firm*—Lane, Aitken, Dunner & Ziems

[57] ABSTRACT

Particles contained in a fluid are set in motion and guided onto the sensitive face of a piezoelectric detector at an oblique angle of incidence and the relative velocity of the particles with respect to the detector is determined. The amplitudes and number of electrical signals delivered by the detector under the impact of the particles are measured and provide the masses and concentration respectively of said particles after calibration of said detector.

11 Claims, 5 Drawing Figures

METHOD AND DEVICE FOR THE RAPID MEASUREMENT OF THE MASS AND CONCENTRATION OF PARTICLES

This invention relates to a method of rapid measurement of the mass and the concentration of particles in a given medium which can be either a liquid or a gas. The nature of the particles does not play any part in said method of measurement. The invention further relates to a device for the application of said method.

There are many practical methods for measuring the mass and concentration of particles and those which are the most widely adopted at the present time make advantageous use either of the inertia of particles or of the diffusion of light by the particles. In the first method, modification of the speed at which particles travel through nozzles and elbows results in sorting of said particles which are then deposited on plates or filters and observed under a microscope. Analysis of the results cannot be carried out simply and this represents a major drawback. In the second method just mentioned, the quantity of light diffused depends on the size of diffusing particles, thus permitting classification of these latter. However, the devices which are based on this method are delicate and limited solely to laboratory use.

This invention proposes a method and a device for measuring the mass and the concentration of particles in such a manner as to meet practical requirements more effectively than the methods and devices employed in the prior art, especially insofar as the measurements are more simple and less sensitive to variations in the ambient medium.

More precisely, the invention proposes a method of rapid measurement of the mass and the concentration of particles contained in a fluid wherein said particles are caused to collide with the sensitive face of a piezoelectric detector at an oblique angle of incidence, the relative velocity of said particles with respect to said detector being determined, and wherein a measurement is taken of the amplitudes and number of electrical signals supplied by said detector under the impact of said particles, said amplitudes and said number being such as to provide after calibration of said detector the masses and concentration respectively of said particles.

The invention further proposes a device for the application of said method, wherein said device comprises at least one piezoelectric detector, means for imparting motion to and guiding said particles onto the sensitive face of said detector, means for measuring the velocity of said particles and means for measuring the amplitudes and number of electrical signals delivered by said detector.

A better understanding of the invention will be obtained from a perusal of the following description of two embodiments of the invention which are given by way of explanatory example but not in any sense by way of limitation, reference being made to the accompanying drawings, wherein.

Figure 1:
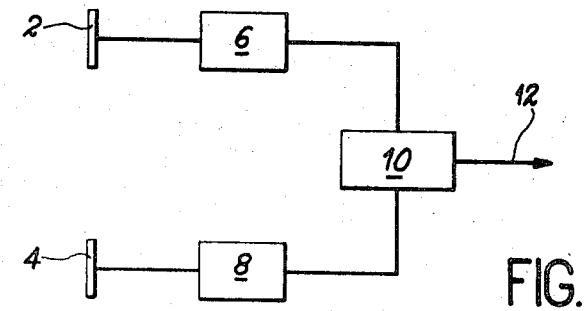
FIG. 1 illustrates a method of the prior art which is similar to the method of the present invention and makes use of two piezoelectric detectors.

The method which bears the closest resemblance to the present invention makes use of a device which is illustrated diagrammatically in FIG. 1.

The device of the prior art which is shown in FIG. 1 comprises two piezoelectric detectors 2 and 4, the particles whose mass and concentration are to be determined being applied to the sensitive face of the detector 2 whilst the detector 4 serves as a frequency reference. The detectors 2 and 4 oscillate at their natural frequencies by means of two generators designated respectively by the reference numerals 6 and 8.

By way of example, the generator 6 delivers a frequency of $10^7$ cps and the generator 8 delivers a frequency of $(10^7 + 10^3)$ cps. The signals derived from the generators 6 and 8 are applied to the two inputs of a mixer 10 which delivers at its output 12 a signal having a frequency which results from beating of frequencies of the signals derived from the generators 6 and 8. In the example just considered, the beat frequency is $10^3$ cps. Steps are taken to ensure that, when no particle strikes the detector 2, the beat frequency at the output 12 is constant, this being obtained as a result of good stabilization of the piezoelectric detectors 2 and 4. The sensitive face of the detector 2 is coated with a layer of adhesive and when the particles strike said face, they consequently adhere thereto and this has the effect of reducing the resonant frequency of the piezoelectric detector. As a result, the frequency of the signal delivered by the generator 6 decreases by an amount which is proportional to the mass of particles which adhere to the sensitive face of the detector. This gives rise to a variation in the beat frequency of the signal at the output 12 of the mixer 10. The variations in said beat frequency after calibration of the device make it possible to determine the mass of the particles. This device is subject to disadvantages and among these can be mentioned the need to employ two piezoelectric detectors and to stabilize the resonant frequency of these detectors. In particular, it is necessary to carry out thermal stabilization of the two detectors 2 and 4, the resonant frequency of the signals delivered by these detectors being highly sensitive to temperature changes.

The method according to the invention is based on the following fact: when a particle strikes the sensitive face of a piezoelectric detector, there takes place a deformation of said sensitive face as a result of the impact and this results in the appearance of an electrical signal at the output of the piezoelectric detector.

A phenomenon of this type has already been employed for determining, for example, the position of the interface between the lower zone of an enclosure in which a substance in suspension in a fluid has a relatively high density and the upper zone of the enclosure in which the density is of lower value. These devices do not permit quantitative measurement of the characteristics of the substance in suspension (velocity, mass and the like) but permit only qualitative observations (location of a level). The deformation of the sensitive face of a piezoelectric detector increases with the mass and the velocity of the particle. Thus, at constant velocity, the amplitude of the electrical signal is proportional to the mass of the particle. Moreover, each time a particle collides with the sensitive face of the detector, an electrical signal appears at the output of this latter. By counting the number of electrical signals which appear at the output of the detector over a predetermined time interval, the value of the particle concentration is obtained from a knowledge of the particle velocity. It is clearly necessary to ensure preliminary calibration of the piezoelectric detector and of the measuring chain. This calibration is carried out very simply by means of particles having a known speed of displacement and mass.

Figure 2A:
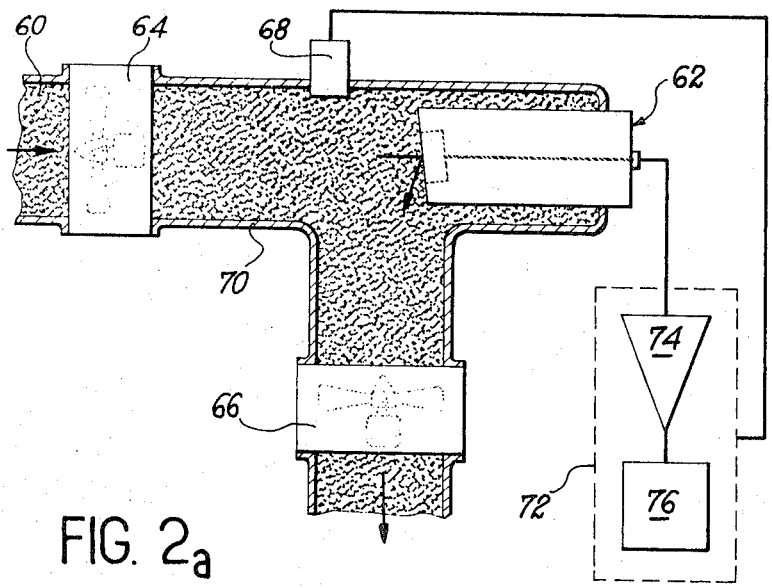
FIG. 2a is a schematic representation of the complete device in the case in which the fluid is set in motion and the probe is stationary.

In accordance with the present invention and as shown in FIG. 2a, when it is desired to determine the mass and concentration of particles contained in a fluid 60 (gas or liquid), said particles are set in motion by directing them at a predetermined velocity onto the sensitive face of a piezoelectric probe 62. The displacement of said particles is obtained by imparting motion to the fluid containing these latter, for example by means of units 64 and 66 which are blowers $\theta$ if said fluid is a liquid. The particle transport velocity is determined by employing a device 68 of the flowmeter type for measuring the rate of flow of the fluid within the pipe 70. The electrical signals delivered by the probe 62 are analyzed within the assembly 72 which can comprise an amplifying stage 74 followed by a multichannel analyzer 76 which totalizes the number of signals per channel, one channel being such as to correspond to a predetermined range of amplitude.

Figure 2B:
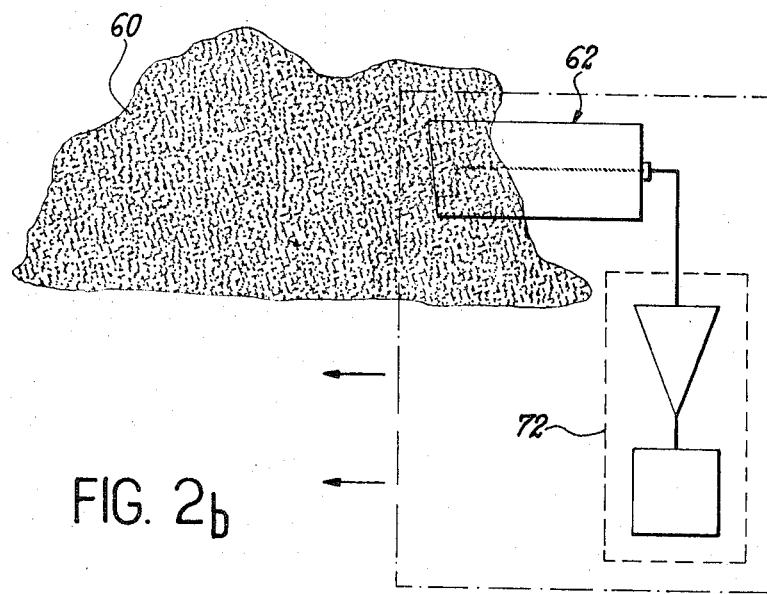
FIG. 2b is a schematic representation of the device of the case in which the fluid is motionless and the probe is set in motion.

As illustrated in FIG. 2b, it is also possible to ensure that the piezoelectric probe 62 moves at constant speed within the medium 60 which contains the particles if the device is placed on board an aircraft or a missile which traverses a cloud of particles, for example.

After calibration of the piezoelectric detector, the amplitudes and the measurement of the number of signals received provide respectively the masses and the concentration of the particles within the fluid. When a particle strikes the sensitive face of the detector, said particle recoils and moves away from the target. Assuming that the particles strike the sensitive face of the detector at right angles, they recoil at right angles to said face and are then again carried by the fluid onto the face of the detector. This results in an error of measurement since some particles may be counted twice. In order to overcome this disadvantage, the incidence of the particles on the face of the detector is oblique, with the result that the particles move away from the target after having recoiled from this latter and are transported outside the detector by the fluid. The method of measurement is not dependent either on the characteristics of the piezoelectric material of the detector or on the dimensions and characteristics of the incident particles. Thus, in the method according to the present invention, only the pulse amplitudes and count rates are measured and this is carried out in a more simple and sensitive manner than a measurement of variation in beat frequency as in the case of the device shown diagrammatically in FIG. 1.

Figure 3:
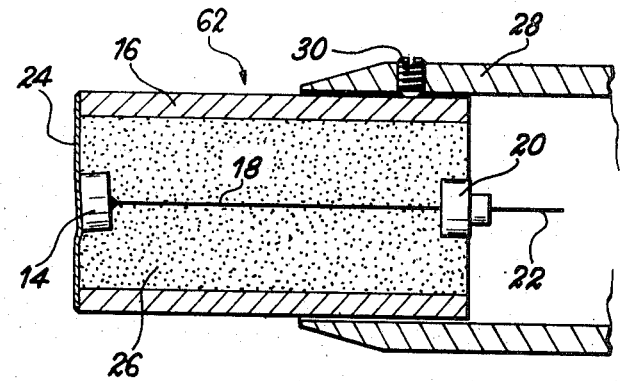
FIG. 3 illustrates a first embodiment of the piezoelectric probe comprising a single detector.

In FIG. 3, which illustrates a first form of construction of the probe 62 according to the invention, a piezoelectric detector 14 is contained within an enclosure 16 formed by a hollow metallic cylinder. The piezoelectric detector 14 consists simply of a pellet of piezoelectric material (for example ceramic material containing lead titanate or zirconate). Said pellet can have any desired diameter such as 1 to 3 mm, for example, and its natural oscillation frequency is 1 Mc/sec to 10 Mc/sec. An electric lead-wire 18 is bonded or soldered to the rear face of the piezoelectric pellet and thus constitutes the output of the piezoelectric detector whilst the other extremity of the electric lead-wire 18 is connected to a plug 20 which constitutes the output of the device. Said output is connected by means of an electric lead-wire 22 to the input of the means 72 for measuring the amplitudes and the number of electrical signals emitted by the detector 14 under the impact of the particles on the front face of the detector. Said front face is connected electrically to the metallic cylinder 16 by means of a conductive layer 24 which can be a layer of electrically conductive paint or an electrodeposited coating of gold or copper having a thickness of a few tens of microns, for example. Said coating offers high resistance to repeated particle impacts and does not cause the least hindrance to the transmission of the impact pulse between the particle and the detector 14.

The interior of the cylinder 16 is filled with electric insulating material 26 such as, for example, resin or plastic material which is poured into the cylinder (commercially available materials known by the trade-marks "Araldite" or "Silastene," for example). Said insulating material 26 is chosen so as to damp the vibrations of the rear face of the detector 14, which makes it possible to prevent parasitic reflected ultrasonic waves. The cylinder 16 is adapted to fit within a hollow metallic cylinder 28, a screw 30 being employed on the one hand in order to rigidly fix the cylinder 16 within the cylinder 28 and, on the other hand, to ensure a good electrical contact between these two cylinders 16 and 28. The front face of the detector to which the particles are applied is connected electrically to the cylinder 16 by means of the conductive layer 24 and the electric potential of the cylinders 16 and 28 serves as a reference (frame earth or ground). The piezoelectric detector 14 is slightly inclined with respect to the axis of the cylinders 16 and 28 so that the incidence of the particles on the front face of the detector should be oblique, thereby overcoming the disadvantage of recoiling of particles and return of these latter to the sensitive face.

The particle transport velocity must be of higher value as the mass of particles is smaller. Moreover, the trajectory of the particles is disturbed to a correspondingly lesser extent as the diameter of the target carrying the piezoelectric detector 14 is of smaller value. When the concentration of the particles is high, there is liable to be an accumulation of electrical signals; but this is prevented by reducing the diameter of the piezoelectric detector 14 and by increasing the natural vibration frequency of this latter in order that it should have a shorter response time. The vibrations of the ambient medium give rise to spurious electrical signals which are produced by the piezoelectric detector 14 and constitute the background noise of the apparatus. In order to minimize said noise, it is advisable to provide optimum mechanical insulation for the detector 14, to employ a highly elastic insulating material 26 and to make use of fairly heavy piezoelectric detectors 14 in order that the piezoelectric materials should in fact have a pressure-sensing function and not an acceleration-measuring function.

Figure 4:
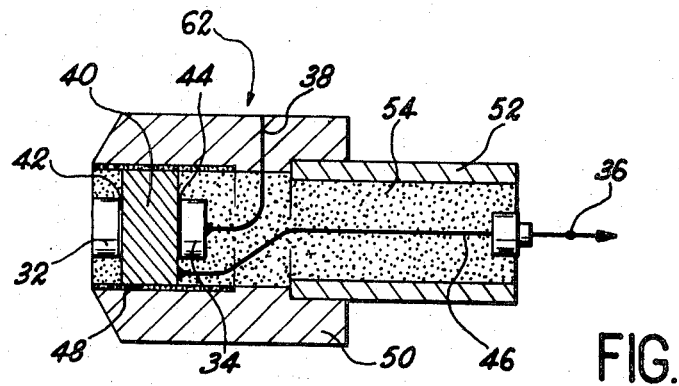
FIG. 4 illustrates a second alternative embodiment of the probe comprising two piezoelectric detectors which are mounted to act in opposition.

In order to prevent spurious signals which are derived from mechanical vibrations produced by the ambient medium, the second embodiment shown in FIG. 4 can advantageously be adopted for the probe 62. In this form of construction, the probe comprises two piezoelectric detectors 32 and 34 which are mounted in electrical opposition. The output is designated by the reference 36 whilst a lead-wire 38 which is embedded in the mass of the assembly by means of a conductive adhesive serves to connect the detector 34 to ground (namely that face of the detector which is not in contact with the cylinder 40).

The particles whose mass is to be measured are applied to the front face of the detector 32 whilst the detector 34 is used as a reference. These two detectors 32 and 34 are bonded on each side of a solid metallic cylinder 40 by means of layers of electrically conductive adhesive as designated respectively by the reference numerals 42 and 44. The sum of the electrical signals derived from the detectors 32 and 34 is directed towards the output 36 by means of a conductor cable 46 which is welded to the solid cylinder 40. The two detectors and the cylinder 40 are placed within the interior of an insulating tube 48 which is in turn contained within a metallic cylinder 50. A metallic tube 52 is adapted to fit into the end of the metallic cylinder 50. An electric insulating material 54 partially surrounds the detectors 32 and 34 as well as the cylinder 40 in order that the interior of the hollow cylinder 50 and the tube 52 should be completely filled. Said electric insulating material 54 ensures on the one hand good electric insulation between the different components and, on the other hand, prevents parasitic reflections of ultrasonic waves from the walls by damping said waves. The output 36 is connected to the input of the measuring chain 72 of FIG. 2. This oppositely-acting circuit arrangement makes it possible to eliminate spurious signals appearing simultaneously and with opposite signs at the output 36 whilst the electrical signals produced by the impact of the particles on the sensitive face of the detector 32 also appear at the output 36 but do not cause the operation of the detector 34. The electrically conductive layers of adhesive 42 and 44 damp the sound waves derived from the detector 32 and resulting from the impact of the particles. The solid metallic cylinder 40 ensures high inertia of the detectors and this makes it possible for the device to operate as a pressure-sensor and not as an accelerometer.

It is readily apparent that the present invention is not limited to the two embodiments which have been illustrated and described by way of explanatory example. In particular, the hollow cylinders 28 and 52 of FIGS. 2 and 3 respectively are not necessary but are advantageously employed as target holders.

What we claim is:

1. A method of measuring the mass and concentration of particles contained in a fluid, comprising the steps of causing a fluid containing particles to collide with the face of a piezoelectric detector at an oblique angle of incidence by moving said detector at a predetermined speed and with a predetermined inclination of the face thereof with respect to the direction of movement, determining the relative velocity of said particles with respect to said detector, measuring the amplitude and number of electrical signals produced by said detector under the impact of said particles to provide an indication of the masses and concentration of said particles.

2. A method of measuring a mass and concentration of particles contained in the fluid, comprising the steps of causing the fluid containing particles to collide with the face of a piezoelectric detector at an oblique angle of incidence by impelling said fluid at a predetermined speed and direction with respect to said detector such that said particles collide with the face of said detector at said oblique angle of incidence, determining the relative velocity of said particles with respect to said detector, measuring the amplitude and number of electrical signals produced by said detector under the impact of said particles to produce an indication of the masses and concentration of said particles.

3. The method of claim 2, wherein the step of determining said velocity includes measuring the rate of flow of said fluid with respect to said detector.

4. Apparatus for measuring the mass and concentration of particles contained in a fluid, comprising a piezoelectric probe with a sensitive face for producing electrical impulses when said face is struck by particles, means for impelling a fluid containing particles in a predetermined direction toward the face of said probe, said sensitive face being oriented obliquely with respect to said predetermined direction of said fluid, means producing an output indicative of the velocity of said particles relative to said probe, and a measurement system responsive to said output indicative of velocity and to the number and amplitude of said electrical impulses for indicating the concentration and masses of said particles.

5. The apparatus of claim 4, wherein said means for impelling said fluid includes a channel leading to said sensitive face and means to drive said fluid down said channel toward said face.

6. The apparatus of claim 4, wherein said means for producing an output indicative of velocity includes a flowmeter located upstream of said detector.

7. The apparatus of claim 4, wherein said measurement system includes an amplifier and a multichannel amplitude analyzer.

8. Apparatus for measuring the mass and concentration of particles contained in a fluid, comprising a piezoelectric probe with a sensitive face for producing electrical impulses when said face is struck by particles, means for impelling a fluid containing particles in a predetermined direction toward the face of said probe, means producing an output indicative of the velocity of said particles relative to said probe, and a measurement system responsive to said output indicative of velocity and to the number and amplitude of said electrical impulses for indicating the concentration and masses of said particles, said probe including a piezoelectric detector contained in the bottom of a hollow metallic cylinder, the axis of said detector being oblique with respect to the axis of said cylinder, a conductive layer electrically connecting the sensitive face of said detector with said metallic cylinder, a lead wire interconnecting the opposite face of said detector to said measurement system.

9. The apparatus of claim 8, wherein said conductive layer is an electrodeposited metal coating.

10. The apparatus of claim 8, wherein said metallic cylinder is filled with an elastic electrically insulating material.

11. Apparatus for measuring the mass and concentration of particles contained in a fluid, comprising a piezoelectric probe with a sensitive face for producing electrical impulses when said face is struck by particles, means for impelling a fluid containing particles in a predetermined direction toward the face of said probe, means producing an output indicative of the velocity of said particles relative to said probe, and a measurement system responsive to said output indicative of velocity and to the number and amplitude of said electrical impulses for indicating the concentration and masses of the said particles, said probe including two piezoelectric detectors operatively mounted to act in opposition, one of said detectors providing said sensitive face.

* * * * *